US011555417B2

(12) United States Patent
Kempinger et al.

(10) Patent No.: US 11,555,417 B2
(45) Date of Patent: Jan. 17, 2023

(54) HOUSING ARRANGEMENT FOR A TURBOMACHINE AS WELL AS TURBOMACHINE ARRANGEMENT HAVING SUCH A HOUSING ARRANGEMENT AND METHOD FOR MANUFACTURING THE HOUSING ARRANGEMENT

(71) Applicant: MTU Aero Engines AG, Munich (DE)

(72) Inventors: Georg Kempinger, Eching (DE); Johann Berger, Moosburg (DE); René Grahnert, Groebenzell (DE); Johannes Dieker, Munich (DE); Tanya Mulorz, Munich (DE); Laura Martinez-Lozano, Munich (DE)

(73) Assignee: MTU Aero Engines AG, Munich (DE)

( * ) Notice: Subject to any disclaimer, the term of this patent is extended or adjusted under 35 U.S.C. 154(b) by 716 days.

(21) Appl. No.: 16/222,166

(22) Filed: Dec. 17, 2018

(65) Prior Publication Data
US 2019/0211708 A1    Jul. 11, 2019

(30) Foreign Application Priority Data
Dec. 18, 2017  (DE) .................... 10 2017 223 112.2

(51) Int. Cl.
*F01D 25/16* (2006.01)
*F01D 25/24* (2006.01)
(Continued)

(52) U.S. Cl.
CPC ............ *F01D 25/162* (2013.01); *F01D 9/00* (2013.01); *F01D 25/14* (2013.01); *F01D 25/16* (2013.01);
(Continued)

(58) Field of Classification Search
CPC ........ F01D 25/16; F01D 25/162; F01D 25/14; F01D 25/246; F01D 25/26; F01D 25/24;
(Continued)

(56) References Cited

U.S. PATENT DOCUMENTS

| 4,457,568 | A |   | 7/1984 | Crawford et al. |
| 5,433,584 | A | * | 7/1995 | Amin ............... F01D 21/045 |
|           |   |   |        | 415/229 |

(Continued)

FOREIGN PATENT DOCUMENTS

| EP | 0976481 B1 | 10/2003 |
| EP | 3203036 A1 | 8/2017 |

OTHER PUBLICATIONS

"Interference fit", https://en.wikipedia.org/wiki/Interference_fit; https://web.archive.org/web/20180711205733/https://en.wikipedia.org/wiki/Interference_fit; Jul. 11, 2018 (Year: 2018).*

(Continued)

*Primary Examiner* — Topaz L. Elliott
(74) *Attorney, Agent, or Firm* — Barlow, Josephs & Holmes, Ltd.; David R. Josephs

(57) ABSTRACT

The present invention relates to a housing arrangement for a turbomachine, comprising a support element, which is configured to bear a shaft, and a housing, which is centered at the support element. The housing is composed of an inner housing and an outer housing fastened at the support element, the housings being connected to each other by at least one connecting strut. A press fit is provided between the support element and the inner housing, in order to center the inner housing at the support element.

12 Claims, 2 Drawing Sheets

(51) Int. Cl.
  *F01D 25/14* (2006.01)
  *F01D 25/26* (2006.01)
  *F01D 9/00* (2006.01)

(52) U.S. Cl.
  CPC ........... *F01D 25/164* (2013.01); *F01D 25/24* (2013.01); *F01D 25/243* (2013.01); *F01D 25/246* (2013.01); *F01D 25/26* (2013.01); *F05D 2220/32* (2013.01); *F05D 2240/14* (2013.01); *F05D 2260/941* (2013.01)

(58) Field of Classification Search
  CPC ........ F01D 25/164; F01D 25/243; F01D 9/00; F05D 2260/941; F05D 2220/32; F05D 2240/14; Y02T 50/60
  USPC ................................................ 415/213.1, 229
  See application file for complete search history.

(56) References Cited

U.S. PATENT DOCUMENTS

| | | | | |
|---|---|---|---|---|
| 9,702,404 | B2* | 7/2017 | Smedresman | ........... F16C 23/08 |
| 10,323,541 | B2* | 6/2019 | Ganiger | ................. F01D 21/08 |
| 2006/0088408 | A1 | 4/2006 | Prestel et al. | |
| 2013/0280063 | A1* | 10/2013 | Ganiger | ................. F16C 27/04 |
| | | | | 415/229 |
| 2015/0330220 | A1 | 11/2015 | Asti et al. | |
| 2016/0032840 | A1 | 2/2016 | James | |
| 2017/0234157 | A1* | 8/2017 | Khan | ...................... F01D 21/00 |
| | | | | 415/229 |

OTHER PUBLICATIONS

Peter R.N. Childs, Engineering Tolerancing in Mechanical Design Engineering Handbook, 2014, https://www.sciencedirect.com/topics/engineering/interference-fit (Year: 2014).*
Parker Hannifin Corporation, "Parker O-Ring Handbook—ORD 5700", Initially released 1957 (Year: 2021).*
English translation of the claims filed Jul. 9, 2020 in the corresponding EPO application 118211310 (Year: 2020).*
"Report to the President by the Presidential Commission on the Space Shuttle Challenger Accident", NASA, Jun. 6, 1986, p. 62.
"O-rings and back-up rings", SKF, 2017, Fig. 1.

* cited by examiner

HOUSING ARRANGEMENT FOR A TURBOMACHINE AS WELL AS TURBOMACHINE ARRANGEMENT HAVING SUCH A HOUSING ARRANGEMENT AND METHOD FOR MANUFACTURING THE HOUSING ARRANGEMENT

BACKGROUND OF THE INVENTION

The present invention relates to a housing arrangement for a turbomachine in accordance with the present invention, a turbomachine arrangement having such a housing arrangement, and a method for manufacturing a housing arrangement for a turbomachine.

Figure 2:
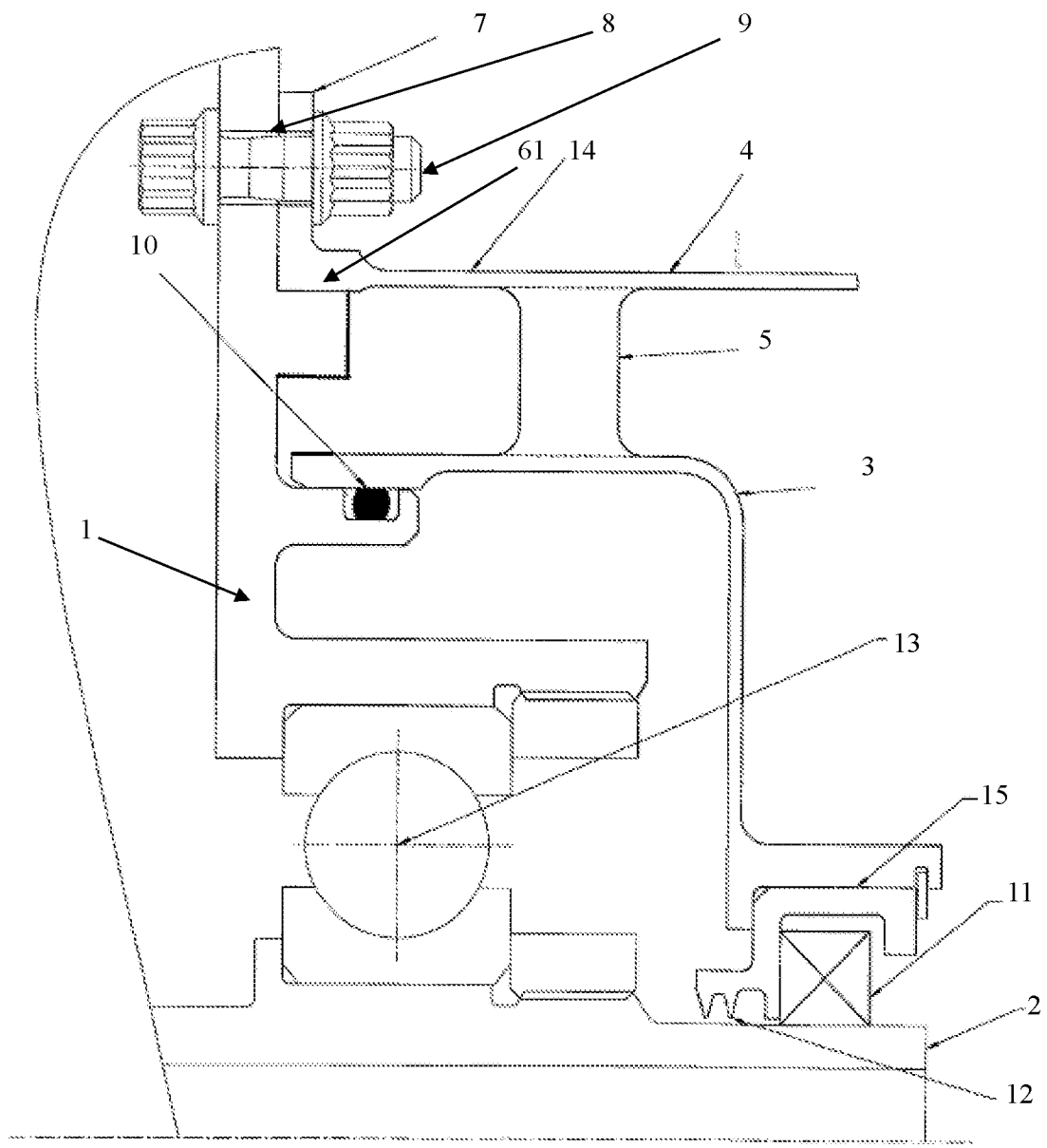

FIG. 2 shows a schematic turbomachine arrangement of an in-house prior art design comprising a housing arrangement. A similar turbomachine arrangement is used in the GEnx© engine. This housing arrangement has a support element 1, which bears a shaft 2 via a bearing 13, which, in particular, is designed as a radial bearing. The housing arrangement further has a housing 14, which is centered on the support element 1 and is composed of an inner housing 3 and an outer housing 4, which is fastened to the support element 1. The inner housing 3 and the outer housing 4 are connected to each other through at least one connecting strut 5. The outer housing 4 has a bolt flange 7 with a through hole 8 for receiving a bolt 9 in order to produce a bolt-nut connection, through which the outer housing 4 is fastened to the support element 1. Directly below the through hole 8, the outer housing 4 is centered and fastened at the support element 1 by a press fit 61. In this way, the inner housing and the outer housing can be relatively easily assembled and disassembled during a maintenance operation. A loosely mounted seal with an O-ring 10, which ensures a sealing between the inner housing 3 and the support element 1, is situated radially in relation to a shaft axis in a roughly middle region between the press fit 61 and the shaft axis. Furthermore, a shaft seal 11, 12 is provided between the inner housing 3 and the shaft 2 and ensures a sealing between the inner housing 3 and the shaft 2.

Furthermore, EP 0 976 481 B1 describes how O-rings can be used in a processing machine. As further prior art, it is possible to refer to the NASA report "*Report to the President, By the Presidential Commission on the Space Shuttle Challenger Accident*," which describes a deformation of an O-ring.

SUMMARY OF THE INVENTION

Diverse requirements need to be met for a housing arrangement and turbomachine arrangement and relate to, in particular, the leaktightness, the fabrication complexity, the weight, and the manufacturing costs. An object of an embodiment of the present invention is to improve a sealing function at the interface to the bearing casing of a housing arrangement and turbomachine arrangement as well as to improve a roundness at the seal-bearing structure, to facilitate the fabrication, and to reduce the costs thereof.

This object is achieved by a housing arrangement, a turbomachine arrangement, and a method for manufacturing a housing arrangement for a turbomachine in accordance with the present invention. Advantageous embodiments of the invention are described in detail below.

In accordance with an aspect of the present invention, the housing arrangement according to the invention for a turbomachine, such as, for example, an aircraft engine, comprises a support element, which is configured, at one end, for bearing a shaft of the turbomachine and, at the other end, for being fastened at a housing, at which the support element is centered, through a flange connection, in particular, through a bolted connection. The bearing of the shaft occurs preferably through a bearing, preferably through a radial bearing, wherein the support element supports a bearing casing of the bearing, which is fixed in position at the support element through a screw plate. The housing has an inner housing, which, in particular, bounds a first, inner oil chamber, and an outer housing, which is fastened to the support element and, in particular, bounds a second, outer oil chamber. The inner housing and the outer housing are structurally connected to each other through a connecting means, in particular at least one connecting strut. Present in the inner oil chamber is the oil provided for lubrication of the bearing. The outer oil chamber serves, among other things, for receiving any oil that possibly leaks from the inner oil chamber. Provided between the outer oil chamber and a main flow path of the turbomachine are additional seals, which, however, will not be described further in the present application. Provided between the support element and the inner housing is a press fit in order to center the inner housing at the support element. Since the press fit as well as the centering are not provided at or near the outer housing, as in the prior art, but rather are advanced radially inward toward the inner housing, the tolerances in the flange region may turn out to be much higher. The press fit is preferably provided in a radially inner region between the bearing and the outer housing; especially preferred, this region extends in the radial direction over two-thirds of the radial extent of the support element between the bearing and the outer housing and/or the flange connection, and, even more preferably, this region extends in the radial direction over half of the radial extent of the support element between the bearing and the outer housing and/or the flange connection. In this way, it is achieved that the press-fit seating has a stabilizing effect on the housing in the radial direction, the support points of which are thereby arranged more distributed in the radial direction. Through the press-fit seating, the inner housing is centered directly at the support element and this has direct effects on the sealing elements. Given equal tolerances, any leakage is markedly reduced in this region based on the centering. As a result, the sealing function at the interface to the bearing housing as well as the roundness at the seal-bearing structure are improved.

In the axial direction, the press fit is situated especially preferably in the middle between the flange linkage of the housing at the support element and the bearing. In this way, any axial vibration of the support element is reduced.

Preferably, for producing the flange connection, the outer housing has a bolt flange with a through hole for receiving a bolt, by way of which the outer housing is fastened at the support element, with the through hole being arranged at a position that, in relation to a shaft axis, is situated radially outside of the press fit. In this way, the centering by means of the press-fit seating is decoupled from the bolted fastening. Since the centering is arranged radially inside of the bolted fastening by means of the press fit, it is possible to use greater tolerances for the press fit, without impairing the leaktightness. Beyond this, the roundness of the seal-bearing housing shell can be improved during operation and the sealing gap and the pressing against an O-ring can be reduced, thereby, in turn, improving the leaktightness. The combination of the bolted connection provided at the outer housing and the press fit that is radially spaced apart from it lead overall to a more stable seating of the inner housing and the outer housing at the support element.

Preferably, the support element has an outer shell surface, in particular at a rib that protrudes on the outer side in the axial direction at the support element, and the inner housing has an inner shell surface, in particular a terminal section of the inner housing facing the support element on the inner side, between which the press fit is provided. Especially preferably, the terminal section of the inner housing is reinforced and/or thickened in order to be able to withstand a higher contact pressure of the press fit. The press fit occurs at a peripheral surface, which extends in the axial direction parallel to the shaft axis of the turbomachine. Further preferably or alternatively, the support element has a flange, which surrounds a shaft axis and at which the outer shell surface is provided, and the inner housing has a flange, which surrounds the axis and on which the inner shell surface is provided. As a result, the press fit can be produced simply and with high precision.

Preferably, in a region of the press fit between the support element and the inner housing, a sealing means, in particular, an O-ring, is arranged for sealing between the support element and the inner housing. The region of the press fit thus fulfills another function for sealing, in addition to the centering.

Preferably, a shaft seal, in particular a labyrinth seal, is arranged between the inner housing and the shaft. In this way, the shaft seal is centered by way of the inner housing. In this case, too, it is possible to use higher tolerances in regard to the shaft seal, because, in comparison to the prior art, the essential centering was advanced radially inward by means of the press fit.

Preferably, the connecting means, in particular, the at least one connecting strut, is so elastic that the inner housing and the outer housing can undergo different thermal expansions. During operation, the outer housing is usually exposed to high temperatures, which are markedly increased in comparison to the oil-carrying interior chamber in the inner housing. The thereby resulting temperature difference causes differing expansion of the components. In order to additionally counter this expansion, it is possible for the connecting means, in particular the connecting strut, to be formed at least partially elastically, for example, by a relatively small wall thickness or through the utilization of a soft material.

The object of the present invention mentioned in the introduction is achieved as well by a turbomachine arrangement that has the housing arrangement and the shaft that is borne in the support element by means of a bearing.

The object of the present invention mentioned in the introduction is achieved as well by a method for manufacturing a housing arrangement for a turbomachine, in particular an aircraft engine, which has the following steps: manufacture of a support element, which is configured for the purpose of bearing a shaft; manufacture of a housing with an inner housing and an outer housing, which are connected to each other through a connecting means, in particular at least one connecting strut; and centering of the inner housing at the support element by means of a press fit between the inner housing and the support element.

BRIEF DESCRIPTION OF THE DRAWING FIGURES

Figure 1:
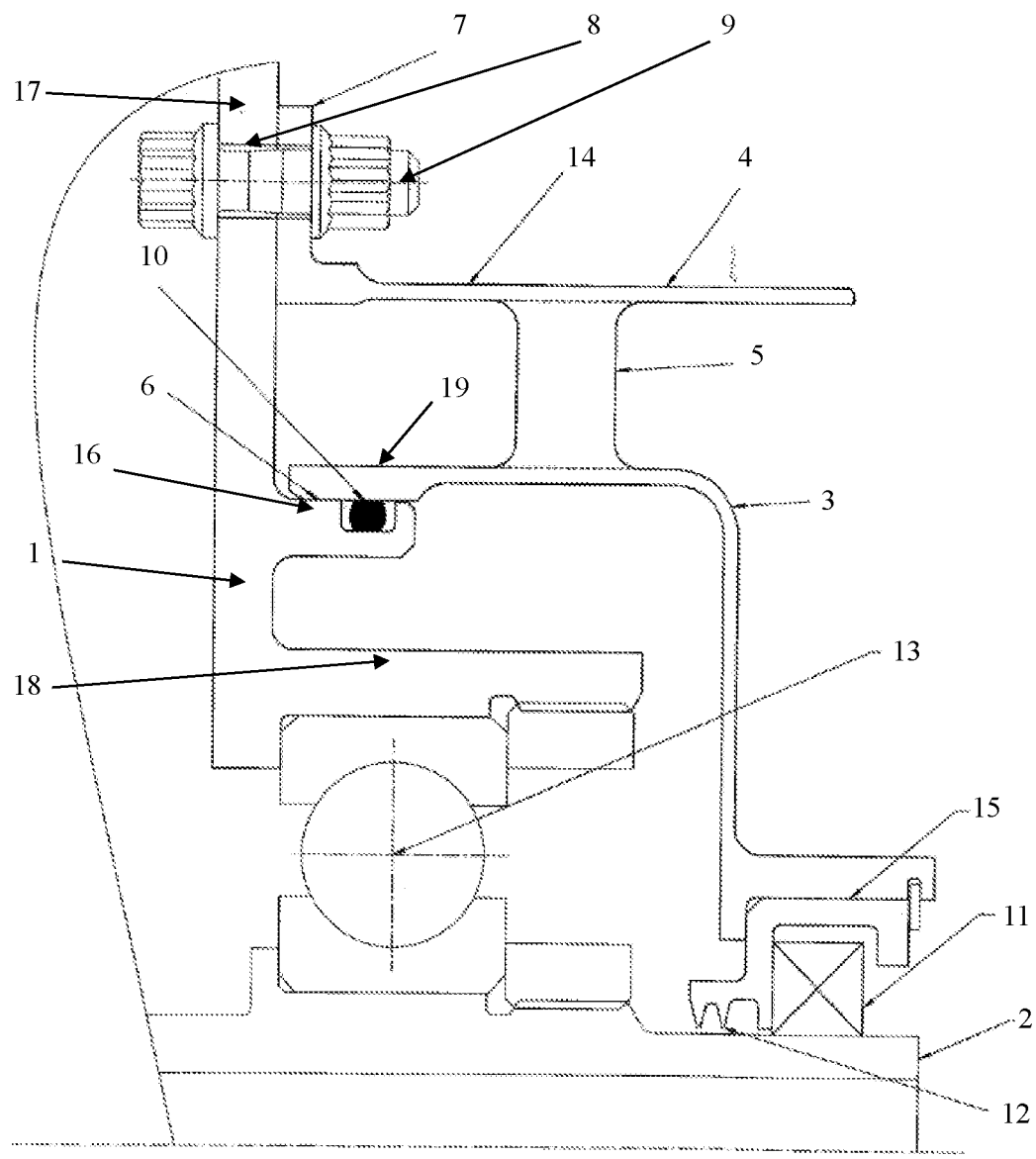

Additional advantageous enhancements of the present invention ensue from the dependent claims and the following description of preferred embodiments. Shown for this purpose, in a partially schematic manner, are:

FIG. 1 a housing arrangement and a turbomachine arrangement in accordance with an embodiment of the present invention; and FIG. 2 a housing arrangement and a turbomachine arrangement in accordance with the prior art.

DESCRIPTION OF THE INVENTION

FIG. 1 shows a housing arrangement and a turbomachine arrangement in accordance with an embodiment of the present invention. The housing arrangement and the turbomachine arrangement are a component part of a turbomachine, such as, for example, of an aircraft engine. The housing arrangement has a support element 1, which is configured to bear a shaft 2. The support element 1 has a first section 17, which is directed essentially vertically relative to an axis of the shaft 2 and, radially inside thereof, a second section 18, which revolves around the shaft 2. In the second section 18 of the support element 1, a bearing 13 is provided, which bears the shaft 2. In the present exemplary embodiment, the bearing 13 is designed as a roller bearing.

The housing arrangement further has a housing 14, which is centered at the support element 1. The housing 14 is composed of an inner housing 3 and an outer housing 4 fastened at the support element 1, these housings being connected to each other by at least one connecting strut 5. Provided between the support element 1 and the inner housing 3 is a press fit 6 in order to center the inner housing 3 at the support element 1.

The outer housing 4 has a bolt flange 7, which has a through hole 8 for receiving a bolt 9 and by which the outer housing 4 is fastened at the support element 1, with the through hole 8 being arranged at a position that, in relation to an axis of the shaft 2, is situated radially outside of the press fit 6. The bolt flange 7 rests against the first section 17 of the support element 1, which is aligned essentially vertically to an axis of the shaft 2.

The support element has 1 an outer shell surface and the inner housing 3 has an inner shell surface, between which the press fit 6 is provided. In this case, the support element 1 has a flange 16, which surrounds an axis of the shaft 2, and at which the outer shell surface is provided. Here, the inner housing 3 has a flange 19, which surrounds the axis of the shaft 2 and at which the inner shell surface is provided.

In relation to the axis of the shaft 2, the fastening of the outer housing 4 is situated at the support element 1 at a radially outer relative position by means of the bolt flange 7, the press fit 6 is situated at a radially middle relative position, and the second section 18 of the support element 1 for receiving the bearing 13 is situated at a radially inner relative position. In this way, the fabrication tolerances in the region of the flanges 16, 19 can turn out to be much higher than in the prior art, because the nominal dimensions have become smaller. More specifically, the press fit 61 of the prior art was replaced by the press fit 6 according to the invention, which is arranged radially further inward and thus has a smaller radius.

The combination of the bolt connection 9, which is provided at the outer housing 4, and the press fit 6, which is radially spaced apart from it at the inner housing 3, leads overall, in comparison to the previously described prior art, to a more stable seating of the housing 14 at the support element 1. In addition, the assembly and disassembly of the housing 14 to and from the support element 1 is relatively simple, because the housing 14 is initially centered via the press fit 6 at the support element 1. Afterwards, the housing 14 can be bolted onto the support element 1 by the bolt 9.

In this case, a re-centering of the through hole 8 of the outer housing 4 at a through hole provided in the support element 1 is not necessary.

In a region of the press fit 6 between the support element 1 and the inner housing 3, an O-ring 10 is provided for sealing between the support element 1 and the inner housing 3. It has been found that the pressing of the O-ring 10 in the press fit 6 does not pose any problem in practice. Furthermore, at the inner housing 3 is arranged a shaft seal 11, 12 for the shaft 2. In the present exemplary embodiment, the shaft seal 11, 12 is formed by a mechanical ring seal 11 and a groove seal 12. The shaft seal 11, 12 is accommodated in a seal mount 15. The seal mount 15 is composed of a flange, which is formed at the outer housing 4 and revolves around the axis of the shaft 2.

The at least one connecting strut 5 is sufficiently elastic that the inner housing 3 and the outer housing 4 can undergo different thermal expansions. This can be achieved, for example, by a relatively thin wall thickness of the connecting strut 5 or through the utilization of a relatively soft material for the connecting strut 5. In the region of the press fit 6, as a rule, no relative displacement between the support element 1 and the inner housing 3 is possible. However, radially above the press fit 6, a relative displacement between the support element 1 and the inner housing 3 is possible, because the connecting strut 5 has the corresponding elasticity. Radially below the press fit 6, a relative displacement between the inner housing 3 and the shaft 2 is likewise possible, because the shaft seal 11, 12 can be shifted axially to a certain extent with respect to the shaft 2.

An exemplary embodiment of a turbomachine arrangement is composed of the previously described housing arrangement and the shaft 2, which is borne in the support element 1 by means of the bearing 13. In this case, the bearing 13 is secured at the shaft 2 and at the support element 1 via locking rings.

During manufacture of the housing arrangement, the support element 1 is produced and is configured to bear the shaft 2. Moreover, the housing 14 is produced with the inner housing 3 and the outer housing 4, which are connected to each other through the at least one connecting strut 5. Subsequently, the inner housing 3 is centered at the support element 1 by means of the press fit 6 between the inner housing 3 and the support element 1. Afterwards, the outer housing 4 can be fastened at the support element 1 by means of the bolt 9.

Although, in the preceding description, exemplary embodiments were explained, it is noted that a large number of modifications are possible. Moreover, it is noted that the exemplary embodiments are solely examples, which are not intended to limit the protective scope, the applications, and the structure in any way. Instead, the preceding description provides the person skilled in the art with a guideline for the implementation of at least one exemplary embodiment, with it being possible to make diverse changes, in particular in regard to the function and arrangement of the described component parts, without leaving the protective scope that ensues from the claims and the combinations of features equivalent to said claims.

What is claimed is:

1. A housing arrangement for a turbomachine, comprising:
   a support element, which is configured for bearing a shaft;
   a housing, which is centered at the support element;
   wherein the housing has an inner housing and an outer housing fastened at the support element, which housings are connected to each other by at least one connecting strut; and
   wherein between the support element and the inner housing, a press fit is provided to center the inner housing at the support element.

2. The housing arrangement according to claim 1, wherein the outer housing has a bolt flange with a through hole for receiving a bolt, by which the outer housing is fastened at the support element, wherein the through hole is arranged at a position that, in relation to an axis of the shaft, is situated radially outside of the press fit.

3. The housing arrangement according to claim 1, wherein the support element has an outer shell surface and the inner housing has an inner shell surface, between which the press fit is provided.

4. The housing arrangement according to claim 3, wherein the support element has a flange surrounding an axis of the shaft and at which the outer shell surface is provided.

5. The housing arrangement according to claim 4, wherein the inner housing has a flange surrounding an axis of the shaft and at which the inner shell surface is provided.

6. The housing arrangement according to claim 3, wherein the inner housing has a flange surrounding an axis of the shaft and at which the inner shell surface is provided.

7. The housing arrangement according to claim 1, wherein, in a region of the press fit between the support element and the inner housing, a seal is arranged for sealing between the support element and the inner housing.

8. The housing arrangement according to claim 1, wherein a shaft seal is arranged between the inner housing and the shaft.

9. The housing arrangement according to claim 1, wherein the at least one connecting strut, is sufficiently elastic that the inner housing and the outer housing can undergo different thermal expansions.

10. The housing arrangement according to claim 9, wherein, in relation to its length, the at least one connecting strut is thinly formed in such a way that the at least one connecting strut is sufficiently elastic that the inner housing and the outer housing can undergo different thermal expansions.

11. The housing arrangement according to claim 9, wherein the at least one connecting strut is produced from a soft, elastic material, which is sufficiently elastic that the inner housing and the outer housing can undergo different thermal expansions.

12. The housing arrangement according to claim 1, wherein the shaft is borne in the support element by a bearing.

* * * * *